(No Model.)

F. G. TAYLOR.
BICYCLE SUPPORT.

No. 456,348. Patented July 21, 1891.

WITNESSES:
Chas. H. Luther Jr.
Henry J. Miller

INVENTOR:
Frederick G. Taylor
by Joseph A. Miller & Co.
Attys

THE NORRIS PETERS CO., PHOTO-LITHO., WASHINGTON, D. C.

UNITED STATES PATENT OFFICE.

FREDERICK G. TAYLOR, OF CRANSTON, RHODE ISLAND.

BICYCLE-SUPPORT.

SPECIFICATION forming part of Letters Patent No. 456,348, dated July 21, 1891.

Application filed April 13, 1891. Serial No. 388,699. (No model.)

*To all whom it may concern:*

Be it known that I, FREDERICK G. TAYLOR, of Cranston, in the county of Providence and State of Rhode Island, have invented certain new and useful Improvements in Bicycle-Supports; and I hereby declare that the following is a full, clear, and exact description of the same, reference being had to the accompanying drawings, forming part of this specification.

This invention has reference to improvements in devices for supporting bicycles when in a stationary position.

The object of this invention is to produce a bicycle-supporting device which will be simple in its operation and which will add very little weight to that of the bicycle.

The invention consists in the simple and novel construction of the device by which the supporting-rod is pivotally held and the means for securing this pivoting device to the bicycle, as will be more fully described hereinafter, and pointed out in the claims.

Figure 1:
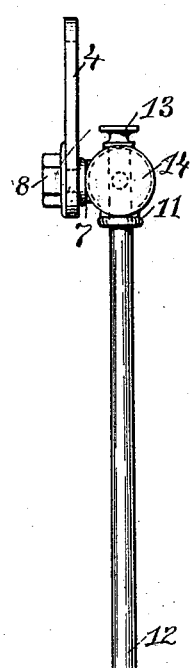
Figure 2:
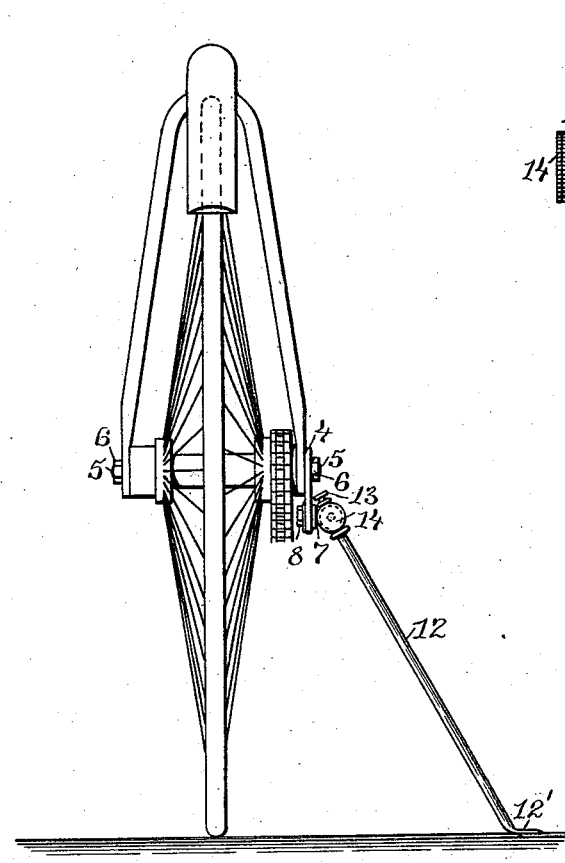
Figure 3:
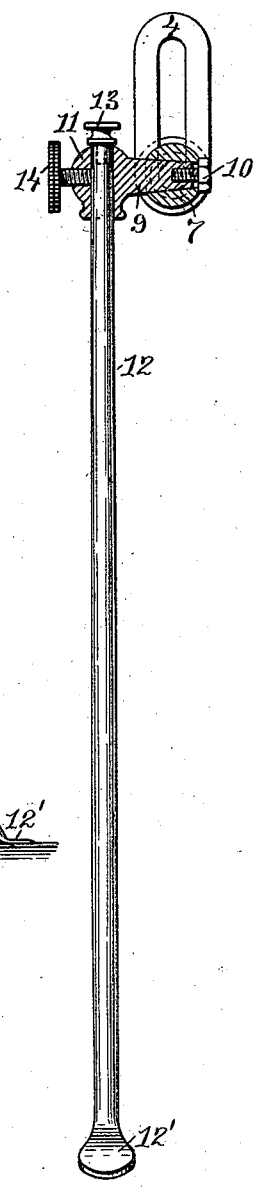
Figure 4:

Figure 1 is a side view of the supporting-rod and pivoting device, the edge of the connecting-link being shown. Fig. 2 represents a portion of a bicycle with the supporting device secured thereto and in a position to support the bicycle. Fig. 3 is a view of the supporting device, the pivotal connection being shown in section to more clearly show the construction of the same. Fig. 4 is a view of the pivotal connection and stop-pin secured to the pivot.

Similar numbers of reference designate corresponding parts throughout.

In the drawings, 4 indicates a flat metal link, made of suitable size so that the end of the axle 5 of the bicycle may pass through the same, which may be secured thereto by the nut 6, screwed onto the axle 5 over the link 4.

To the lower end of the link 4 is secured the perforated sliding bracket 7, which is provided with a screw-threaded arm, which extends through the link 4, on which the bracket 7 is secured by the nut 8, screwed onto said screw-threaded arm. This bracket 7 has a tapering perforation extending transversely through it to receive the tapering pivot 9, which passes part way through said perforation, and is secured therein by the headed bolt 10, which is adapted to take up any wear of the pivot and to adjust the fit of the same in the perforation. The outer end of the pivot 9 is enlarged to form a knob 11, which is provided with a perforation transverse to the direction of the pivot 9, through which the supporting-rod 12, having the head 13, is free to move, but which may be secured at any point in its length by the set-screw 14, working in a threaded perforation in the knob 11 and binding the supporting-rod 12 against the side of the perforation in the knob 11. The supporting-rod may be provided with the flattened step 12', or the end may be sharpened. I also find that this supporting-rod may be hollow without affecting its stiffness and at the same time reducing its weight.

The stop-motion shown in Fig. 4 is for the the purpose of preventing the rod 12 from falling against the bicycle-wheel, and consists of a pin 9', secured in the pivot 9 and engaging the end of the lip 7', formed on the bracket 7.

The operation of my improved bicycle-support is as follows: The link 4 being secured to the axle 5 by the nut 6, the bolt 10 is adjusted to make the friction of the tapering pivot 9 in the perforation of the bracket 7 sufficient to support the weight of the supporting-rod 12. This rod may be turned to an upright position out of the way of the rider, or the thumb-screw 14 may be loosened and the rod moved upward through the perforation in the knob 11, and when at a sufficient height the thumb-screw may be turned to secure the rod in place. When it becomes necessary to use the support, the thumb-screw 14 is turned to release the rod from its pressure, the rod dropping down through the perforation until it reaches the ground, the thumb-screw 14 then being turned to secure the rod in place.

It is obvious that my improved supporting device may be secured to any portion of the bicycle where a bolt and nut are used, and where it will not interfere with the movement of the rider.

Instead of the nut 8 screwing onto an arm with which the bracket 7 is provided, I sometimes prefer to use a short-headed bolt, which passes through the link 4 and engages with a screw-threaded socket, with which the bracket 7 is provided, thus adjustably securing the bracket 7 to the link 4.

Having thus described my invention, I claim as new and desire to secure by Letters Patent—

1. In a bicycle-support, the combination, with a pivotally-supported rod, of a link adjustably secured to the pivotal support and adapted to be secured to the axle of a bicycle, as described.

2. In a bicycle-support, the combination, with the link 4, having the perforated bracket 7 adjustably secured thereto, of the knob 11, provided with the tapering pivot 9 and bolt 10, a central perforation adapted to receive the supporting-rod 12, having the head 13, and a thumb-screw 14, adapted to secure the rod 12 at any point in its length, as and for the purpose described.

FREDERICK G. TAYLOR.

Witnesses:
HENRY J. MILLER,
JOSEPH A. MILLER, Jr.